(12) United States Patent
Kaddoura

(10) Patent No.: US 11,791,980 B1
(45) Date of Patent: Oct. 17, 2023

(54) ZERO-LOSS MERGING OF DISTRIBUTED LEDGERS

(71) Applicant: ARCHITECTURE TECHNOLOGY CORPORATION, Eden Prairie, MN (US)

(72) Inventor: Maher N. Kaddoura, Maple Grove, MN (US)

( * ) Notice: Subject to any disclaimer, the term of this patent is extended or adjusted under 35 U.S.C. 154(b) by 427 days.

(21) Appl. No.: 17/006,064

(22) Filed: Aug. 28, 2020

Related U.S. Application Data

(60) Provisional application No. 62/947,428, filed on Dec. 12, 2019.

(51) Int. Cl.
| | |
|---|---|
| *H04L 9/06* | (2006.01) |
| *G06F 16/23* | (2019.01) |
| *G06Q 20/38* | (2012.01) |
| *H04L 9/32* | (2006.01) |
| *H04L 9/00* | (2022.01) |

(52) U.S. Cl.
CPC ........ *H04L 9/0637* (2013.01); *G06F 16/2379* (2019.01); *G06Q 20/382* (2013.01); *H04L 9/3236* (2013.01); *H04L 9/3297* (2013.01); *G06Q 2220/00* (2013.01); *H04L 9/50* (2022.05)

(58) Field of Classification Search
CPC ... H04L 9/0637; H04L 9/3236; H04L 9/3297; H04L 9/50; G06F 16/2379; G06Q 20/382; G06Q 2220/00
See application file for complete search history.

(56) References Cited

U.S. PATENT DOCUMENTS

| | | | |
|---|---|---|---|
| 10,616,324 | B1 | 4/2020 | Kaddoura |
| 2011/0228678 | A1 | 9/2011 | Ricciulli |
| 2018/0019921 | A1 | 1/2018 | Davis |
| 2018/0254982 | A1 | 9/2018 | Apostolopoulos et al. |
| 2019/0018888 | A1* | 1/2019 | Madisetti .............. H04L 9/3236 |
| 2019/0019180 | A1 | 1/2019 | Coburn et al. |
| 2019/0238486 | A1* | 8/2019 | Zizka ...................... H04L 51/02 |
| 2019/0303622 | A1 | 10/2019 | Versteeg et al. |

(Continued)

OTHER PUBLICATIONS

"Notice of Allowance and Fee(s) Due", U.S. Appl. No. 17/121,125, filed Jun. 1, 2022, 9 pgs.

(Continued)

*Primary Examiner* — Robert W Beausoliel, Jr.
*Assistant Examiner* — Mohammad S Bhuyan
(74) *Attorney, Agent, or Firm* — Carlson, Caspers, Vandenburgh & Lindquist P.A.

(57) ABSTRACT

A program product comprising a non-transitory processor readable medium having software stored thereon. The software, when executed by one or more processing devices, is configured to merge a first distributed ledger with a second distributed ledger to form a merged ledger. The first ledger consists of a first beginning subset of blocks followed by a first end subset of blocks. The second ledger consists of a second beginning subset of blocks followed by a second end subset of blocks. The first beginning subset of blocks is identical to the second beginning subset of blocks and the first end subset of blocks is different than the second end subset of blocks. The merged ledger includes the first beginning subset of blocks followed by blocks corresponding to the first end subset of blocks and the second end subset of blocks.

17 Claims, 14 Drawing Sheets

(56) References Cited

U.S. PATENT DOCUMENTS

| | | | |
|---|---|---|---|
| 2019/0332955 A1* | 10/2019 | Manamohan | G06K 9/6256 |
| 2019/0373521 A1 | 12/2019 | Crawford | |
| 2020/0076610 A1 | 3/2020 | Wang | |
| 2020/0349123 A1* | 11/2020 | Irazabal | G06F 16/1805 |
| 2020/0394162 A1 | 12/2020 | Iizuka | |
| 2021/0044443 A1* | 2/2021 | Cronie | H04L 9/3271 |
| 2021/0104326 A1 | 4/2021 | Lorenzo et al. | |
| 2021/0109797 A1 | 4/2021 | Zhou | |
| 2021/0176038 A1 | 6/2021 | Bortnikov et al. | |
| 2021/0250812 A1 | 8/2021 | Caswell | |
| 2021/0334244 A1 | 10/2021 | Takahashi et al. | |

OTHER PUBLICATIONS

"Final Office Action", U.S. Appl. No. 16/946,230, filed Mar. 18, 2022, 7 pgs.

"Final Office Action", U.S. Appl. No. 16/946,230, filed May 9, 2022, 8 pgs.

"Notice of Allowance and Fee(s) Due", U.S. Appl. No. 17/039,323, filed Jun. 20, 2022, 13 pgs.

"Non-Final Office Action", U.S. Appl. No. 16/946,230, filed Oct. 25, 2021, 9 pgs.

Weston et al., Performance of blockchain technology on DoD tactical networks, May 2019, SPIE, All pages (Year: 2019).

"Non-Final Office Action", U.S. Appl. No. 17/039,323, filed Feb. 11, 2022, 33 pgs.

"Notice of Allowance and Fee(s) Due", U.S. Appl. No. 16/946,230, filed Sep. 16, 2022, 9 pgs.

\* cited by examiner

Fork Due to Network Partition ant patent US 11,791,980 B1

ZERO-LOSS MERGING OF DISTRIBUTED LEDGERS

RELATED APPLICATIONS

This application claims the benefit of U.S. Provisional Application No. 62/947,428 filed on Dec. 12, 2019, entitled "SCALABLE AND RELIABLE BLOCKCHAIN FOR LOW BANDWIDTH AND UNSTABLE NETWORKS", which is hereby incorporated herein by reference.

GOVERNMENT CONTRACTS

This invention was made with government support under contract W56KGU-19-C-0037 awarded by the U.S. Army. The government may have certain rights in the invention.

BACKGROUND

Distributed ledger protocols constitute the underlying technology for developing Peer-to-Peer (P2P) databases, which possess three attributes that traditional databases lack: 1) disintermediation: data is available to all the nodes; 2) high fault tolerance: the database will continue to operate even if a large percentage of its nodes are disabled; 3) immutability: it is impossible to falsify data once it is committed to the database. Current distributed ledger systems fail, however, when deployed in low-bandwidth and disconnected-network environments, such as tactical networks.

BRIEF DESCRIPTION

Embodiments for a program product comprising a non-transitory processor readable medium having software stored thereon are provided. The software, when executed by one or more processing devices, is configured to merge a first distributed ledger with a second distributed ledger to form a merged ledger. The first ledger consists of a first beginning subset of blocks followed by a first end subset of blocks. The second ledger consists of a second beginning subset of blocks followed by a second end subset of blocks. The first beginning subset of blocks is identical to the second beginning subset of blocks and the first end subset of blocks is different than the second end subset of blocks. The merged ledger includes the first beginning subset of blocks followed by blocks corresponding to the first end subset of blocks and the second end subset of blocks.

Embodiments for a device having one or more processing devices and storage media communicatively coupled to the one or more processing devices are also provided. The storage media includes software stored thereon. The software, when executed by the one or more processing devices is configured to merge a first distributed ledger with a second distributed ledger to form a merged ledger. The first ledger consists of a first beginning subset of blocks followed by a first end subset of blocks. The second ledger consists of a second beginning subset of blocks followed by a second end subset of blocks. The first beginning subset of blocks is identical to the second beginning subset of blocks and the first end subset of blocks is different than the second end subset of blocks. The merged ledger includes the first beginning subset of blocks followed by blocks corresponding to the first end subset of blocks and the second end subset of blocks.

Embodiments for a method for one or more ledgers are also provided. The method includes merging a first distributed ledger with a second distributed ledger to form a merged ledger. The first ledger consists of a first beginning subset of blocks followed by a first end subset of blocks. The second ledger consists of a second beginning subset of blocks followed by a second end subset of blocks. The first beginning subset of blocks is identical to the second beginning subset of blocks and the first end subset of blocks is different than the second end subset of blocks. The merged ledger includes the first beginning subset of blocks followed by blocks corresponding to the first end subset of blocks and the second end subset of blocks.

DRAWINGS

Understanding that the drawings depict only exemplary embodiments and are not therefore to be considered limiting in scope, the exemplary embodiments will be described with additional specificity and detail through the use of the accompanying drawings, in which.

Figures 5A, 5B, 5C:
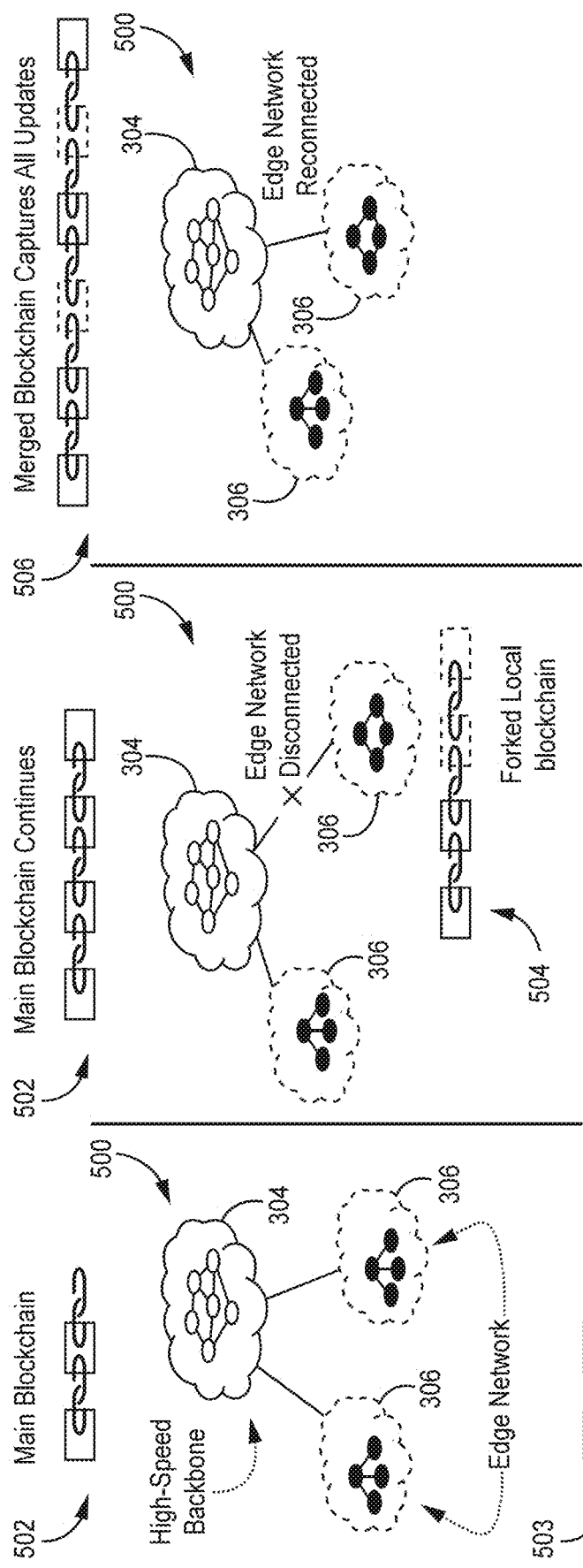
Figure 6:
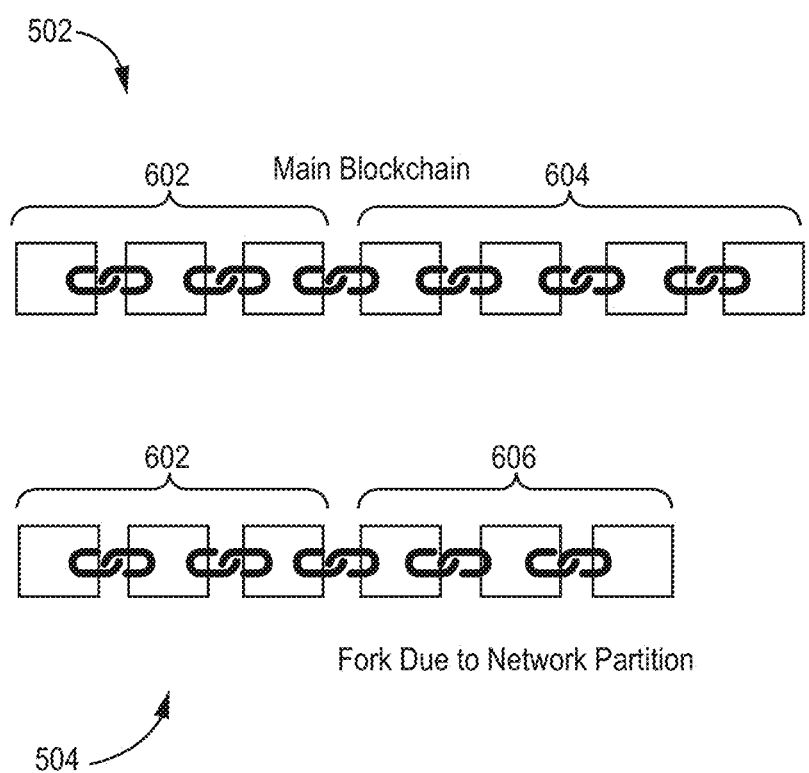
Figure 7:
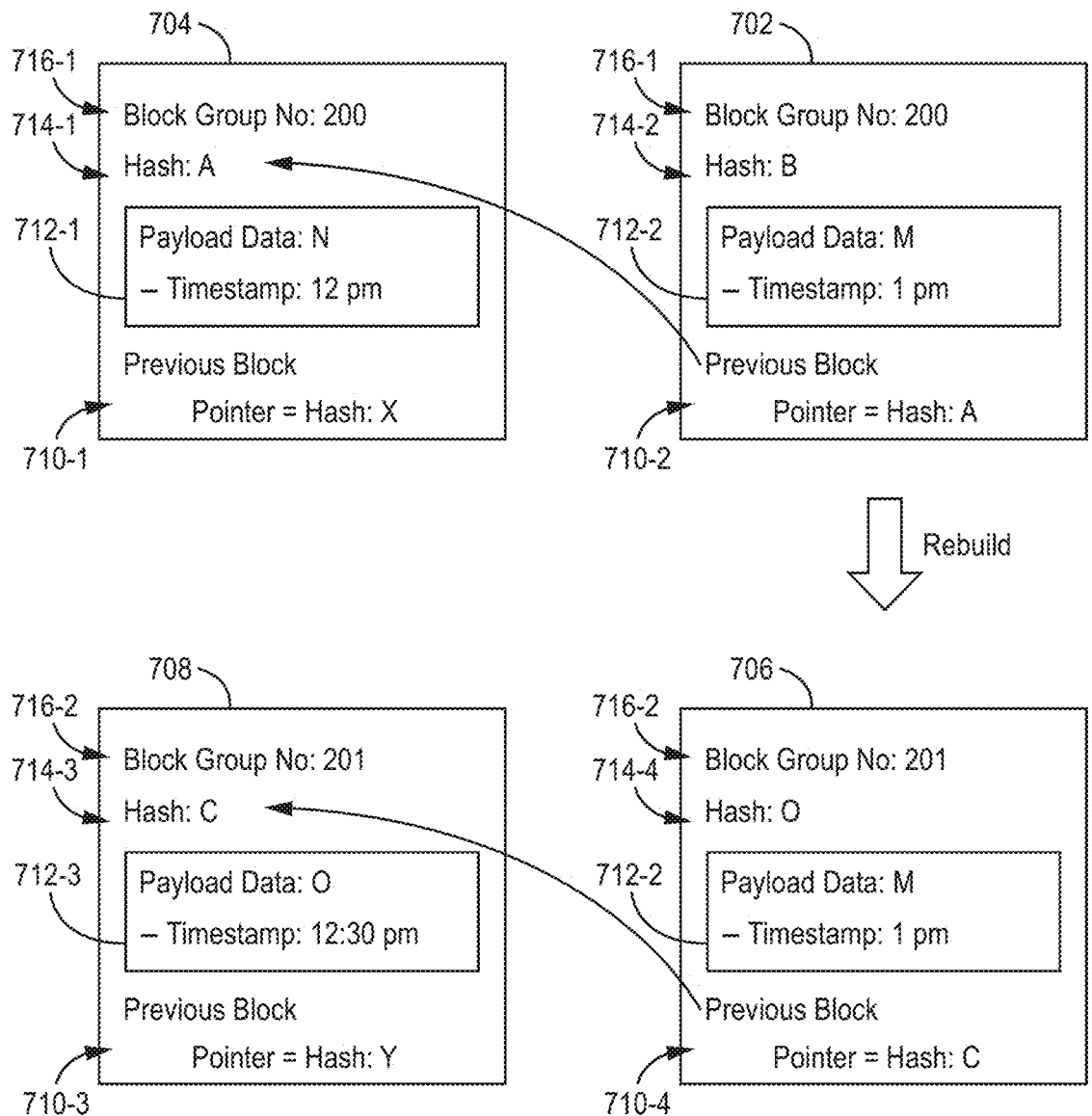
Figure 8:
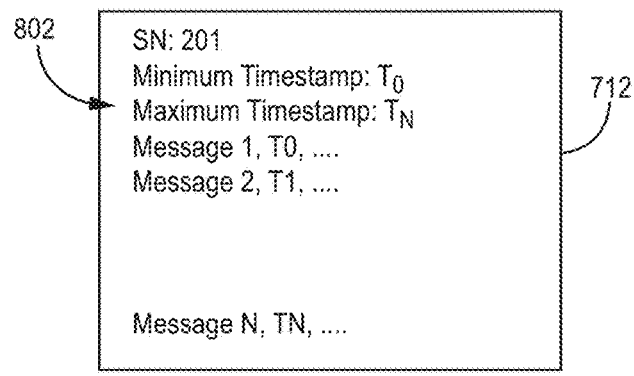
Figure 9:
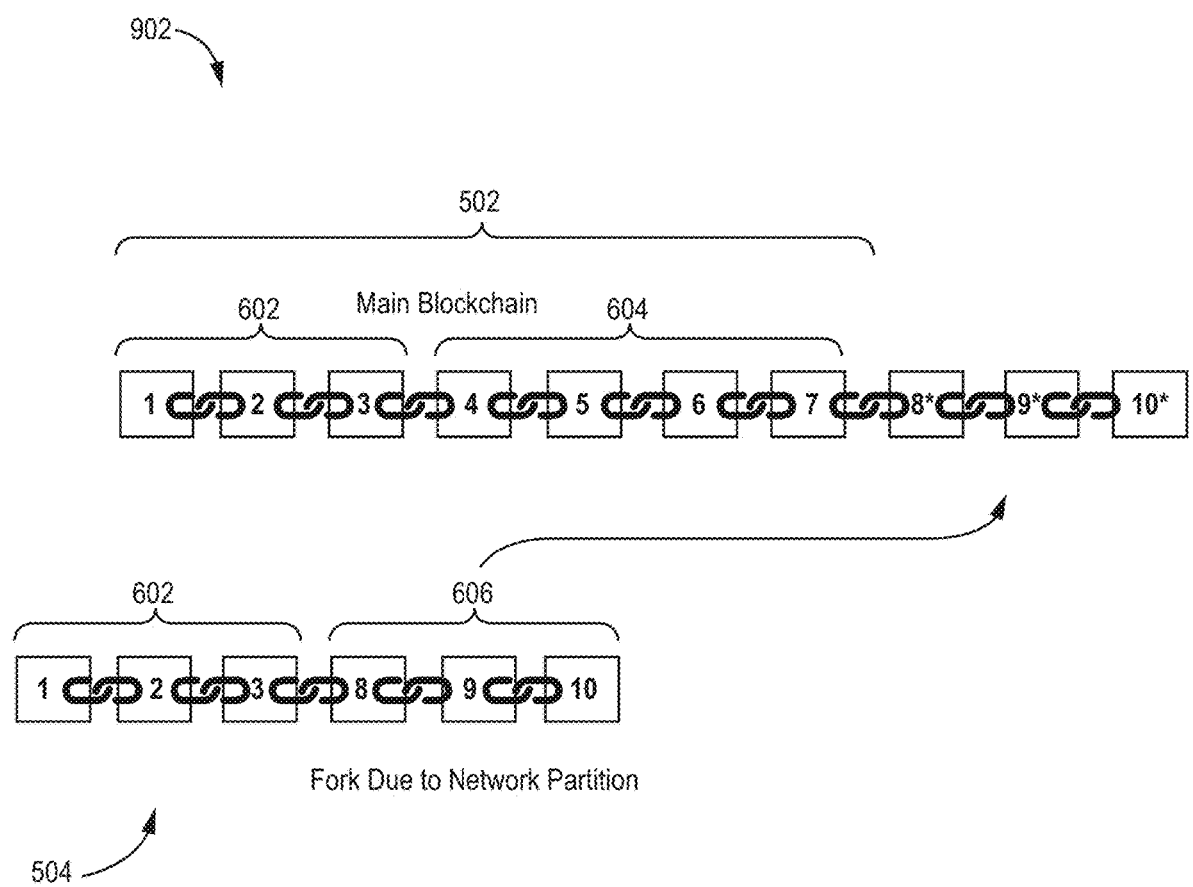
Figure 10:
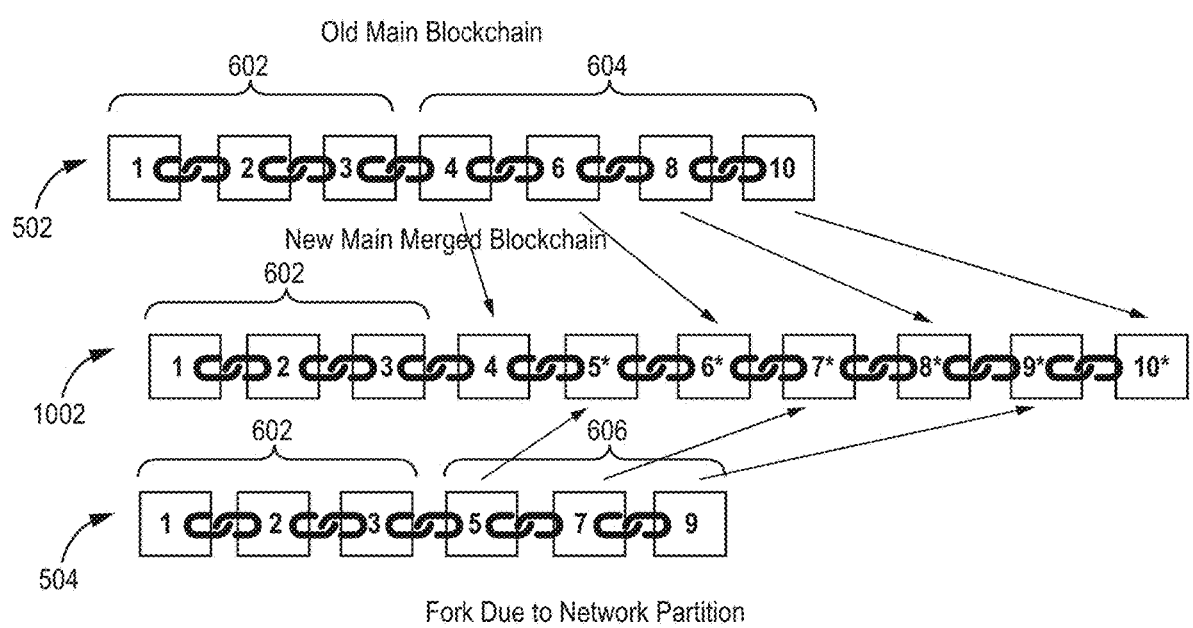
Figure 11:
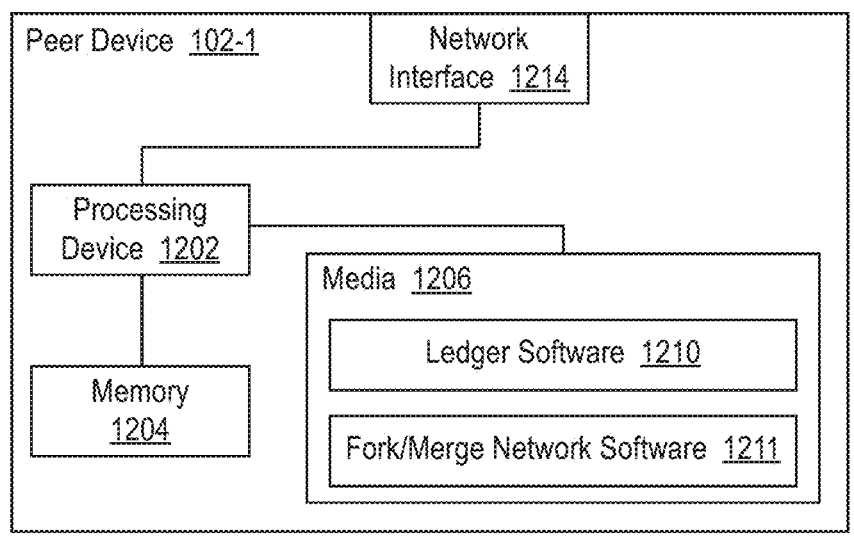
Figure 12:
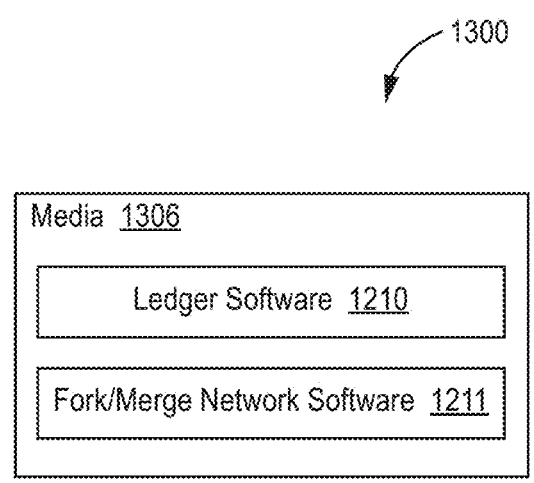
Figure 13A:
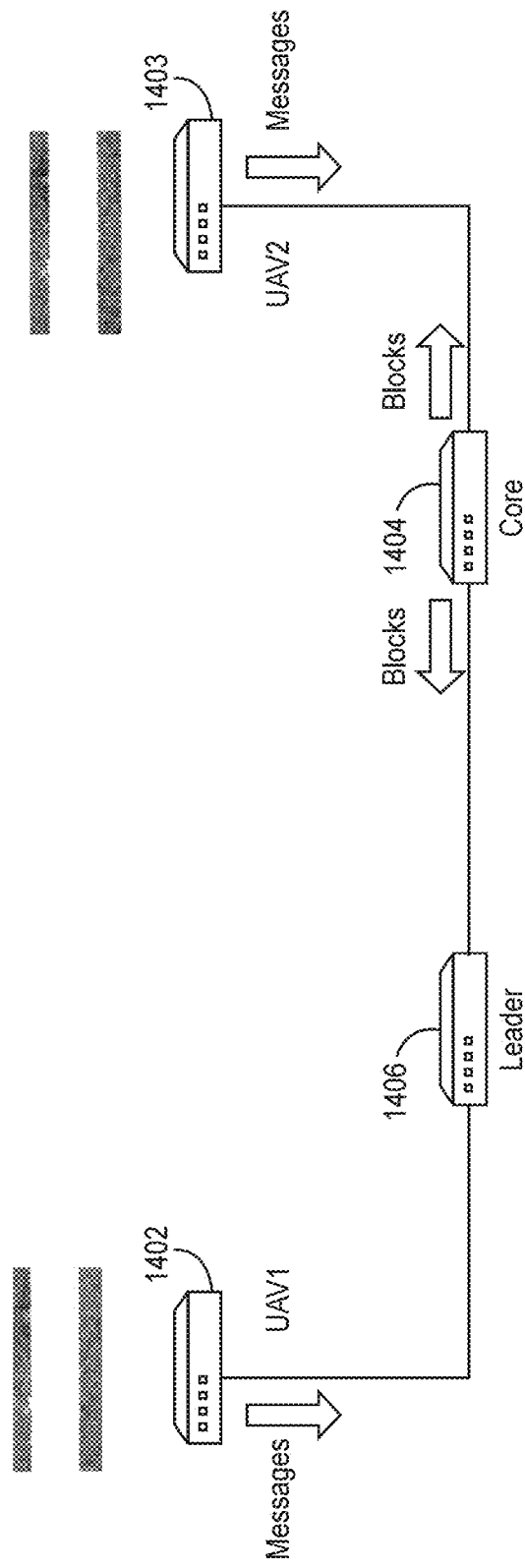
Figure 13B:
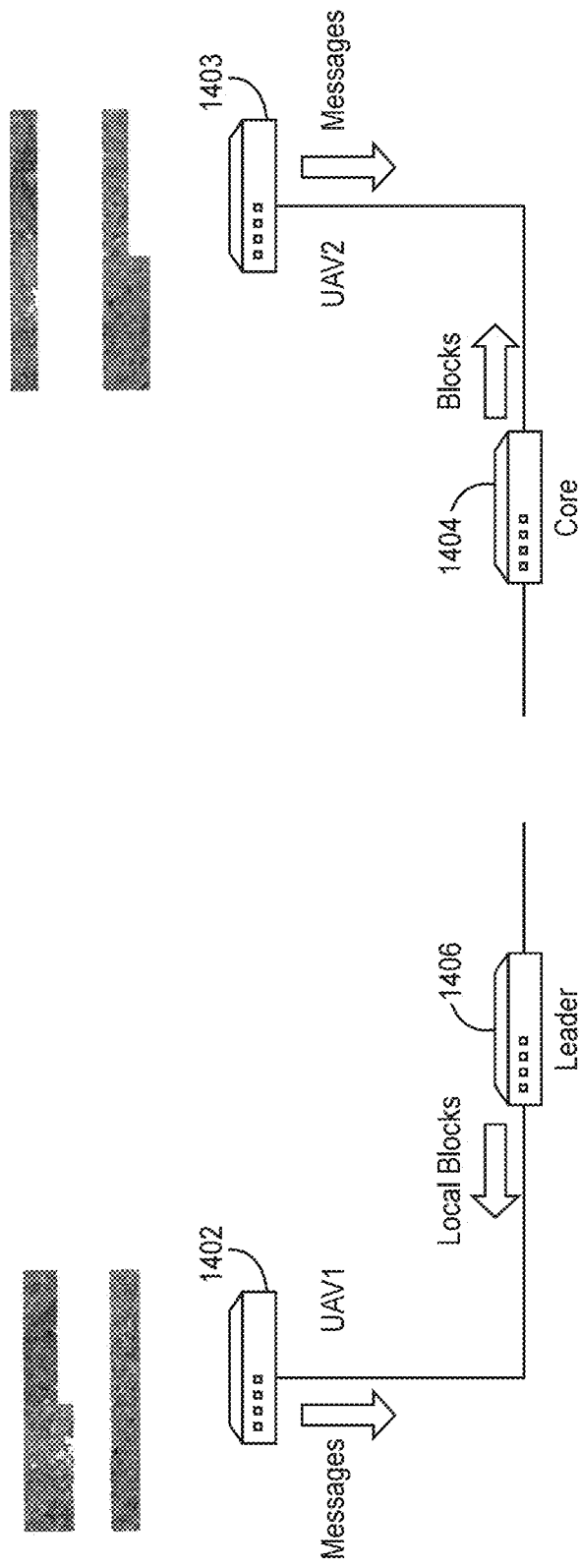
Figure 13C:
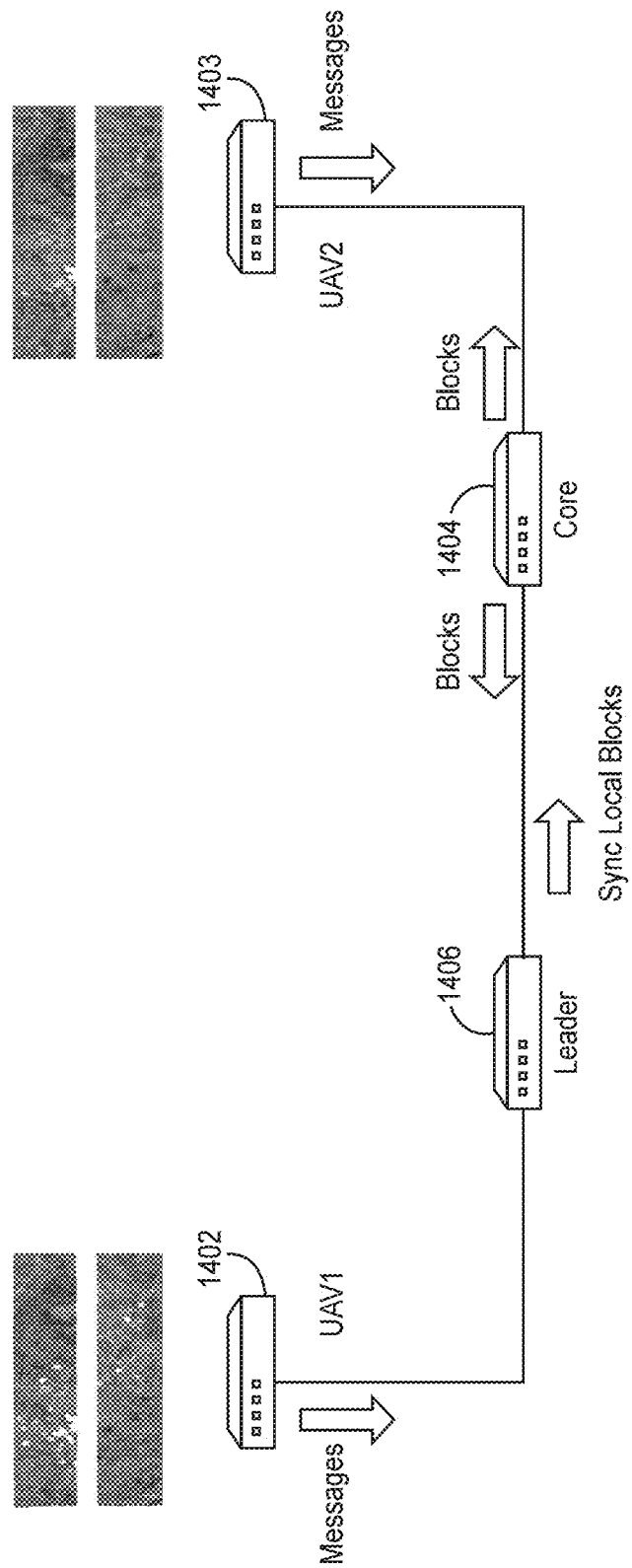

FIGS. 5A, 5B, and 5C are block diagrams of example overlay network during periods of disconnection and reconnection;

FIG. 6 is a block diagram of an example main ledger and an example forked ledger;

FIG. 7 is a block diagram of an existing block and previous block and a rebuilt version of the existing block and previous block;

FIG. 8 is a block diagram of payload data in a block;

FIG. 9 is a block diagram of an example merged ledger;

FIG. 10 is a block diagram of another example merged ledger;

FIG. 11 is a block diagram of an example ledger peer;

FIG. 12 is a block diagram of an example program product including ledger software for implementing the fork and merge processes described herein; and FIGS. 13A-13C are block diagrams of an example network implementing a distributed ledger during periods of normal operation, disconnection, and reconnection.

DETAILED DESCRIPTION

Figure 1:
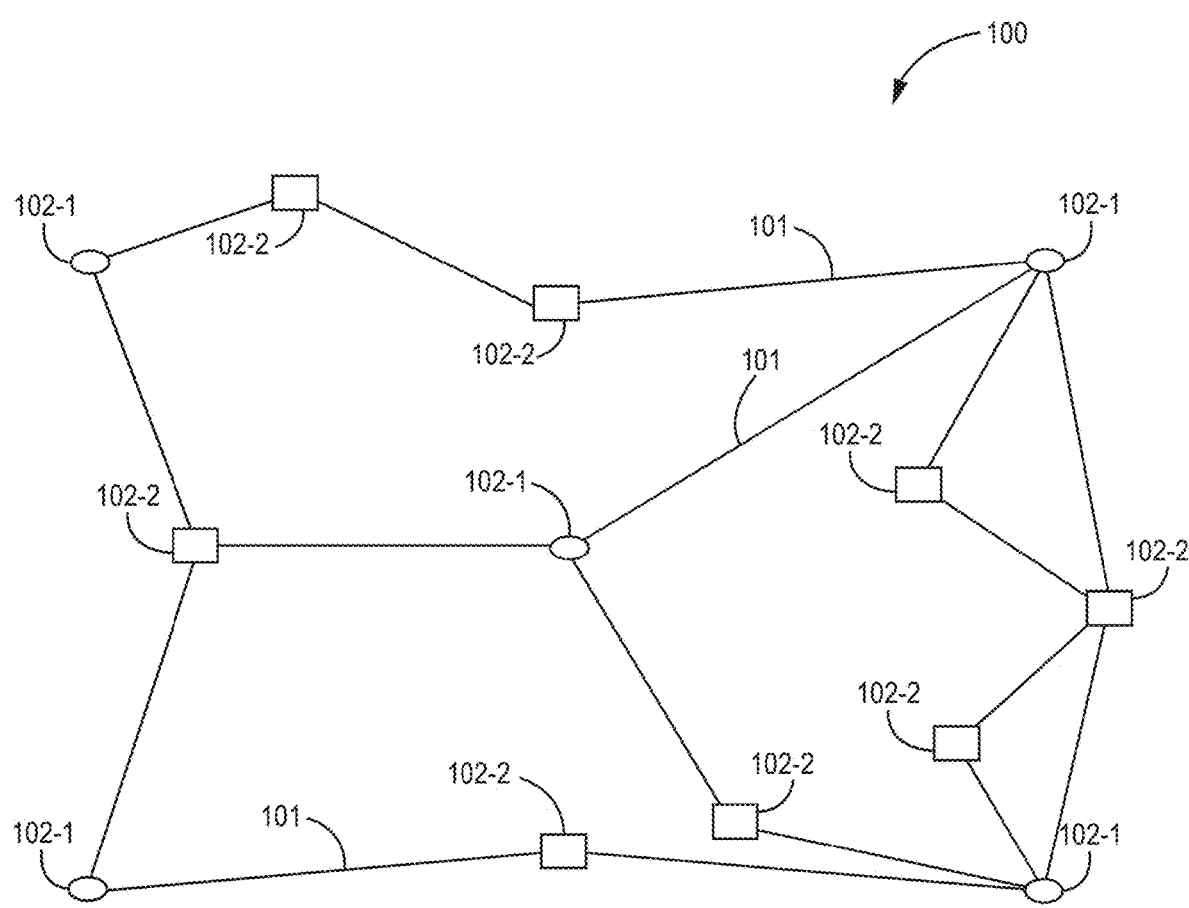
FIG. 1 is a block diagram of an example network that implements a P2P distributed ledger database that accounts for low-bandwidth and unstable network links.

FIG. 1 is a block diagram of an example network 100 that implements a P2P distributed ledger database that accounts for low-bandwidth and unstable network links. In an example, the distributed ledger is a blockchain. FIG. 1 includes a plurality of nodes that are communicatively coupled together via a plurality of network links 101. Each network link 101 can be a physical link implemented over one or more physical communication media (e.g., an Ethernet cable such as a cat-5E compliant cable) or can be a wireless link implemented using wireless signals. All or a portion of network 100 can communicate information via packets that conform to the Internet protocol (IP) and/or can communicate information via a non-IP protocol (e.g., a SATCOM protocol).

The network nodes 102 can include ledger peers 102-1 and non-ledger peers 102-2. Ledger peers 102-1 are nodes that are members of a set, which implements a common ledger protocol to communicate messages amongst the ledger peers 102-1 in order to create and maintain one or more distributed ledgers. In an example, each ledger peer 102-1 obtains a copy of the one or more ledgers maintained by the set of ledger peers 102-1. Non-ledger peers 102-2 are nodes that communicate in the network 100, but do not implement the ledger protocol of the ledger peers 102-1. The ledger peer nodes 102-1 and non-ledger peer nodes 102-2 can be any device capable of communicating with other nodes 102 in the network 100. This includes a mobile device such as a mobile phone, laptop, communications radio (e.g., tactical radio), a radio platform for installation in heavy equipment (e.g., military equipment, construction equipment), a wireless wearable device, or a wireless sensor. This also includes manned and unmanned vehicles with communication capabilities, such as heavy equipment, an automobile, an aircraft, or watercraft. This also includes networking devices such as a hub, switch, or router. Each ledger peer 102-1 includes ledger software to implement the ledger protocol thereon.

The plurality of nodes 102 implement one or more network protocols (e.g., IP) to effectuate communication amongst one another through the network 100. In an example, the network 100 sends IP packets to communicate information through the network 100. The ledger protocol implemented by the ledger peers 102-1 implements an overlay network protocol that controls communication of ledger messages/information amongst the ledger peers 102-1. The overlay network protocol operates on top of the (regular) network protocol(s). That is, the overlay network protocol communicates ledger messages/information amongst the ledger peers 102-1 by sending the ledger messages/information via the packets of the regular network protocols thereby using both ledger nodes 102-1 and non-ledger nodes 102-2 of the network 100 to transport the ledger messages/information amongst the ledger peers 102-1.

The overlay network protocol monitors overlay network links between ledger peers 102-1 and implements aspects of the ledger protocol based on the characteristics of the overlay network links. An overlay network link (also referred to herein as simply an "overlay link") is a logical communication path between two ledger peers 102-1. An overlay link starts at a first ledger peer 102-1 and ends at a second ledger peer 102-1. The overlay network protocol can send a ledger message/information over an overlay link to communicate that message/information from one ledger peer 102-1 to another ledger peer 102-1. The overlay link can include a single (regular) network link directly coupling the first ledger peer 102-1 to the second ledger peer 102-2 or the overlay link can include multiple regular network links such that the overlay link traverses one or more intermediate non-ledger nodes 102-2. Accordingly, a packet corresponding to a ledger message/information can hop through one or more non-ledger nodes 102-2 as it traverses a single overlay link.

Figure 2:
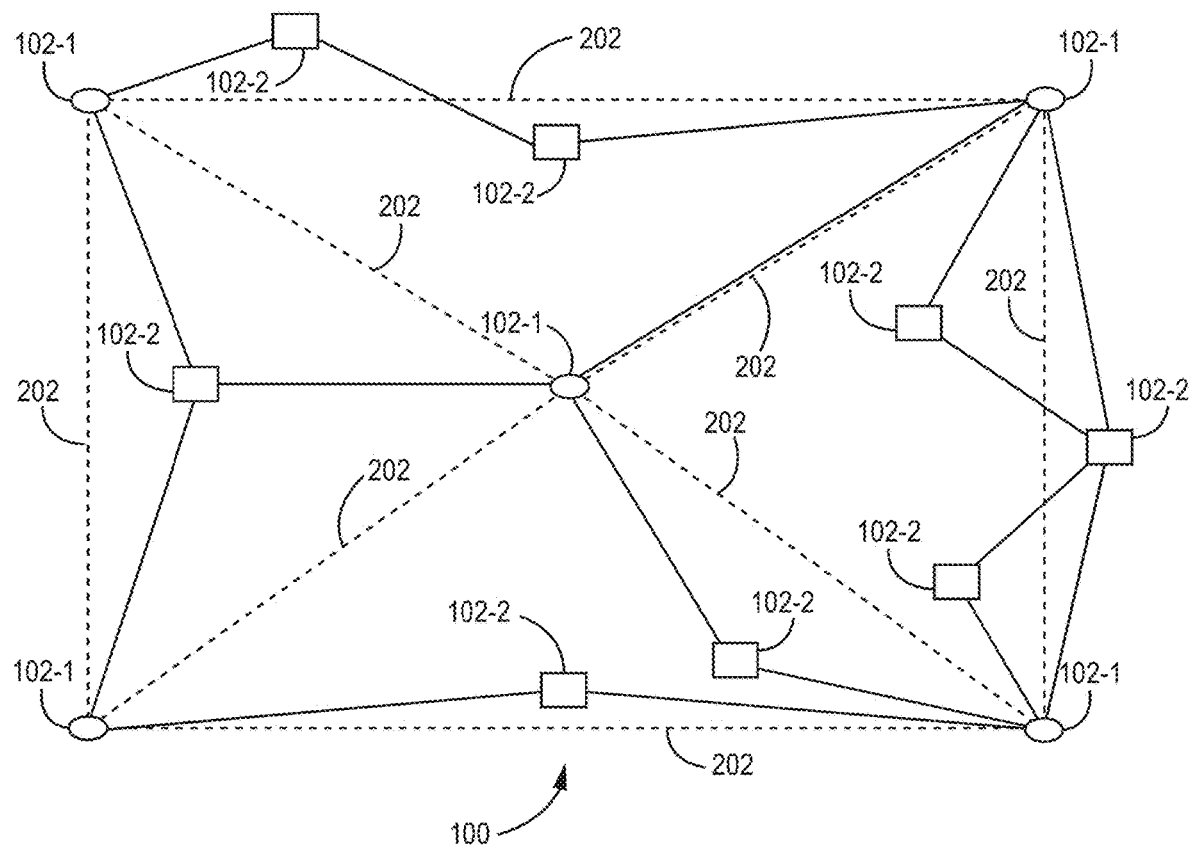
FIG. 2 is a modified version of FIG. 1 illustrating the overlay links between peers.

FIG. 2 is a modified version of FIG. 1 illustrating the overlay network links 202 between ledger peers 102-1. As mentioned above, the overlay network protocol uses the overlay links to send ledger messages/information amongst the ledger peers 102-1. The overlay network protocol can implement an overlay routing protocol to control how ledger messages/information are routed amongst the ledger peers 102-1. To implement such a routing protocol, the overlay network protocol assigns and monitors the overlay network links 202. Assigning an overlay link 202 refers to the act of selecting which two ledger peers 102-1 make up the endpoints of a given overlay link 202. Two ledger peers 102-1 that make up the endpoint of an overlay link 202 are referred to herein as "neighbors". By assigning ledger peers 102-1 as endpoints of specific overlay links 202 the overlay network protocol establishes an overlay network amongst the peers 102-1.

Neighboring peers 102-1 can be assigned based on characteristics of the (regular) network links 104 forming the path between peers 102-1. The overlay network protocol can be configured to set up overlay links such that no ledger peers 102-1 are an intermediary point for an overlay link 202. For example, if a first peer 102-1 is communicatively coupled to a third peer 102-1, but the network path from the first peer 102-1 to the third peer 102-1 travels through a second peer 102-1, the overlay protocol will not assign a overlay link between the first peer 102-1 and the third peer 102-1. Instead, the overlay protocol will assign a first overlay link between the first peer 102-1 and the second peer 102-1, and a second overlay link 202 between the second peer 102-1 and the third peer 102-1.

Other characteristics used can be the stability, bandwidth, whether a network path exists to a peer, and/or packet loss of a network path. For example, if a first peer 102-1 has network paths to multiple other peers 102-1, the overlay protocol can select which of the other peers 102-1 are neighbors based on the stability, bandwidth, and/or packet loss of the network paths between those peers 102-1. That is, the overlay routing protocol can select neighbors having network paths therebetween with higher stability, bandwidth, and/or lower packet loss. In an example, stability of an overlay link can be a percentage of time the overlay link is disconnected. Additional information regarding an example overlay network and characteristics thereof is provided in co-pending U.S. Patent Application Ser. No. 16/946,230, titled "P2P OVERLAY FOR DISTRIBUTED LEDGER", which is hereby incorporated herein by reference.

Figure 3:
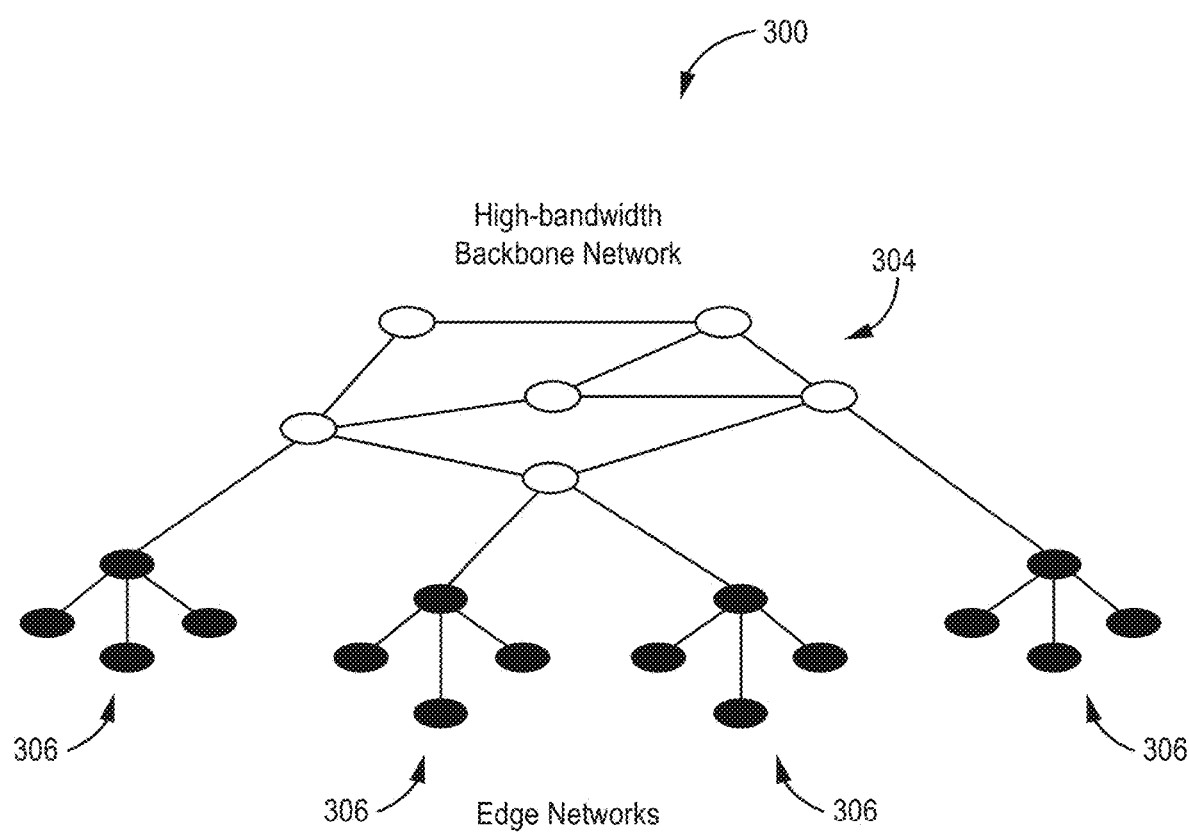
FIG. 3 is a block diagram of another example overlay network that is composed of multiple networks.

FIG. 3 is a block diagram of another example overlay network 300. In an example, the overall overlay network 300 can be divided up into different portions and each portion can be set-up and managed individually by the peers 102-1 of that portion. Example network 300 is divided into 5 different portions. The 5 portions include one core network 304 and four edge networks 306. An edge network 306 can also be referred to as a tactical edge network (TEN).

In an example, each peer 102-1 can be manually configured with information identifying the edge/core network 304, 306 of which that peer 102-1 is a part. When the peers 102-1 are communicatively coupled together, the peers 102-1 can identify other peers 102-1 in their core/edge network 304, 306 and implement the overlay routing protocol to set-up and manage their core/edge network independently of other core/edge networks. For example, if a peer 102-1 has information indicating that it is in the core network 304, the peer 102-1 implements its overlay network protocol based thereon.

In an example, the peers 102-1 can select neighbors and a routing protocol based on which core/edge network 304, 306 the peer 102-1 is a part of. For example, neighboring peers 102-1 for overlay links can be limited to peers 102-1 that are within the same core/edge network 304, 306. This effectively creates separate routing spaces for each network 304, 306. The exception to limiting neighbors is for peers 102-1 in an edge network 306 that are selected as leaders. The overlay protocol can select one peer 102-1 in each edge network 306 as leader for that network 306. The leader can identify one or more overlay links between itself and the core network 304. The overlay link(s) between the leader and the core network 304 are used to transfer ledger messages/information between the edge network 306 and the core network 304.

Peers 102-1 can be selected to be in the core network 304 based on the characteristics of the peer 102-1 itself, the characteristics of the peer's potential overlay links with other peers 102-1 in the core network 304, or a domain or autonomous system that the peer 102-1 belongs to. For example, if a peer 102-1 has sufficiently high processing performance and has one or more sufficiently stable and high bandwidth links to other peers 102-1 in the core network 304 the peer 102-1 can be indicated as part of the core network. In other examples, the selection of which network a peer 102-1 is a part of can be based on a domain or autonomous system that the peer 102-1 belongs to. That is, the peer 102-1 can be set as part of the same network as other peers 102-1 in that peer's 102-1 LAN.

Figure 4:
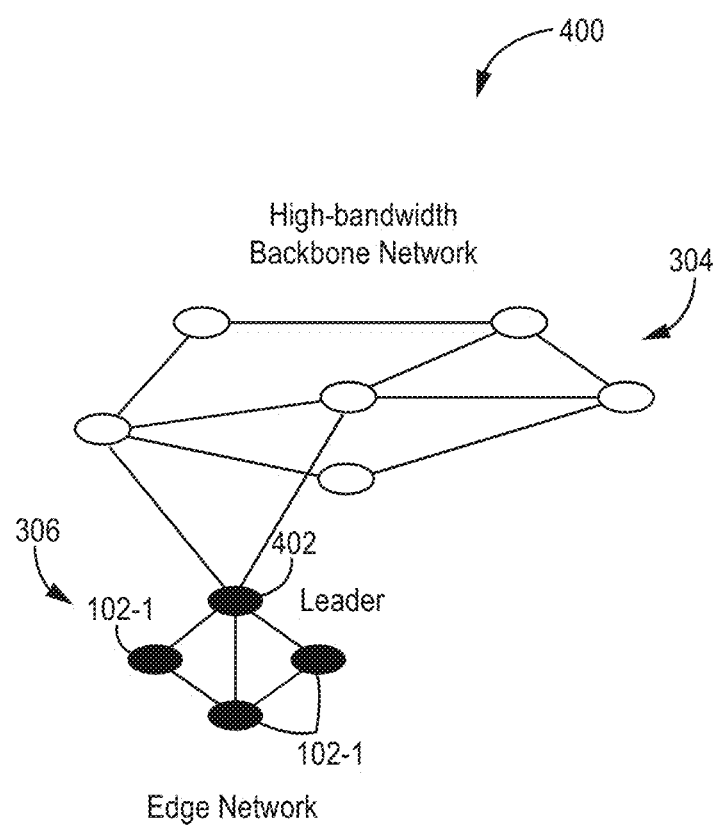
FIG. 4 is a block diagram of another example overlay network having an edge network with a leader.

FIG. 4 is a block diagram of an example overlay network 400 illustrating a leader peer 402 for an edge network 306. In an example, the peers 102-1 in an edge network elect a leader 402 for their network 306. The leader 402 is selected from the peers 102-1 within the network. The leader 402 establishes and maintains the overlay links with the core (backbone) network 304. The leader 402 leader can establish one or more overlay links with one or more core peers 102-1 and monitor these overlay links for failures. If an existing overlay link with the core network 304 becomes disconnected, the leader 402 will try to establish a new overlay link to the core 304. The peers 102-1 in the edge network 306 can select their leader 402 based on attributes that can be manually set. The attributes to be set can include characteristics of potential overlay links with the core 304 and computing resources of the peer 102-1. For example, a leader 402 can be selected as a peer 102-1 have a threshold level of computing resources and the best potential overlay link with the core 304. In an example, the leader 402 can be the gateway between the edge network 304 and the core 306.

The distributed ledger(s) maintained by the peers 102-1 includes a list of records. Each record, which is also referred to herein as a block, includes information corresponding to ledger message/information from a peer 102-1. In an example, peers 102-1 in edge networks 306 do not create blocks for the ledger themselves or participate in committing of blocks to the ledger. Instead, peers 102-1 in edge networks 306 send ledger messages/information for block creation and commitment to the core network 304. Peers 102-1 in the core network 304 then perform the computationally intensive process of creating a block(s) from the ledger message/information and committing the block(s) to the ledger. Once the block has been created, the block can be distributed back to peers 102-1 in the edge networks 306 along with peers 102-1 in the core network 304. Using this process to limit block creation to peers 102-1 in the core network 304 can be advantageous in situations where the edge networks 306 have generally lower bandwidth and/or lower computational power peers 102-1 than the core network 304.

Distribution of ledger messages/information can also be limited based on network. First, ledger messages/information in an edge network can be distributed to all peers 102-1 in the edge network of which the message/information originated. For example, a ledger message/information from a peer 102-1 in a first edge network 306 can be distributed to all other peers 102-1 in the first edge network 306. Second, ledger messages/information can be distributed to the core network 304 regardless of which network the message originated in. Thus, a ledger message originating in the first network 304 can be distributed to all the peers 102-1 in the core network 304 in addition to peers 102-1 in the first edge network 306. Third, ledger messages/information from a given edge network 306 are not distributed to peers 102-1 in edge networks 306 from which they did not originate. Thus, a ledger message/information from the first edge network 306 is distributed to all peers 102-1 in the first edge network 306 and all peers 102-1 in the core network, but that message/information is not distributed to peers 102-1 in any other edge network 306. To restrict ledger messages/information from being distributed to other edge networks 306, peers 102-1 in the core network 304 can be configured not to transmit ledger messages/information to peers 102-1 in edge networks 306. Thus, the ledger messages/information will be distributed through the first edge network 306 of origin by virtue of the overlay routing protocol implemented by the first edge network 306. The leader of the first edge network 306 will also forward the ledger message/information to the core network 306. The overlay routing protocol of the core network 304 will distribute the message/information to all peers 102-1 of the core network 304, but the peers 102-1 of the core network 304 will not distribute the message/information to any edge networks 306. Thus, distribution of the message/information will be limited to the edge network of origin and the core network 304. Limiting message/information distribution in this way is another way to reduce bandwidth and processing requirements on the edge networks 306.

In an example, distribution of the blocks created from a ledger message/information is not limited, such that blocks are distributed to all peers 102-1 in all networks 304, 306, so that all peers 102-1 can have a copy of the ledger(s) being maintained. Thus, distribution of ledger messages/information can be limited, but distribution of the blocks corresponding to those messages/information is not limited.

FIGS. 5A, 5B, and 5C are diagrams of an example network 500 that can maintain a distributed ledger without loss of blocks even when a portion of the network 500 becomes disconnected from another portion. Network 500 can have similar characteristics to network 300 discussed above. As used herein, a portion of the network 500 is disconnected from another portion while no path for communication of network (e.g., IP) packets exists between the two portions. In an example, the overlay protocol can monitor overlay links to identify when an edge network 306 is disconnected from the core network 304. The overlay protocol can also identify when an edge network 306 is reconnected to the core network 304. In an example, the peers 102-1 can send heartbeat messages throughout the network 500 to detect disconnections and reconnections of edge networks 306 and/or can use other messages communicated via the overlay protocol to detect disconnections and reconnections. The overlay protocol can then adjust how blocks for the ledger are formed in response to disconnection and reconnection of an edge network 306 in order to maintain a ledger with all blocks from both portions of a disconnected network.

FIG. 5A illustrates the network 500 at a time in which a first and second edge networks 306 are connected (communicatively coupled) to the core network 304. During this time, peers 102-1 in the edge networks 306 can send their ledger messages/information to the core network 304 where all blocks are created and combined into a single (main) ledger 502. The core network 304 can also send blocks created for the main ledger 502 back to the edge networks 306 so that the edge networks 306 can maintain a copy 503 of the main ledger 502.

FIG. 5B illustrates the network 500 at a time in which the second edge network 306 is disconnected from the core network 304. The overlay protocol monitoring the overlay links detect this disconnection and adjusts creation of blocks so that blocks for messages/information from both disconnected portions ((first portion=core 304+first edge 306) and (second portion=second edge 306)) are maintained. During this time, the (main) ledger 502 being maintained by the core network 304 does not capture messages/information from peers 102-1 in the second edge network 306, because the disconnection prevents the second network peers 102-1 from sending their ledger messages/information to the core network 304. In response to detecting the disconnection, the overlay protocol at the second edge network 306 begins to create blocks locally and adds the locally created blocks to its copy of the ledger, creating a forked ledger 504 at the second edge network 306. Meanwhile the core network 304 continues to create blocks based on the messages/information it receives and continues to add them to the main ledger 502. In an example, the peers 102-1 in the disconnected network 306 can elect one peer 102-1 to create the local blocks and manage maintenance of the forked ledger 504. This election can be based on performance capabilities of the peers 102-1 and/or characteristics of the links to the peers 102-1. In an example, the leader peer 402 of the network 306 can create the local blocks and manage maintenance of the forked ledger 504. The main ledger 502 is maintained and continues to have new blocks added based on ledger messages/information received by the core network 502. Both the main 502 and forked 504 ledgers continue to be created separately while the network 500 is partitioned.

FIG. 5C illustrates the network 500 at a time in which the second edge network 306 is reconnected to the core network 304. In response detecting reconnection of the second edge network 306, the overlay routing protocol merges the forked ledger 504 with the main ledger 502 to create a single merged ledger 506. The merged ledger 506 can contain information corresponding to all the blocks from the main ledger 502 and the forked ledger 504 and will be the main ledger going forward. The formerly disconnected second edge network 306 discontinues creating local blocks and resumes sending information to the core network 304 for block creation.

In an example, the overlay protocol can detect and adjust to multiple edge network disconnections that occur concurrently. For example, if the first edge network 306 becomes disconnected during the period in which the second edge network 306 is disconnected, the overlay protocol on the first edge network 306 and the core network 304 will adjust creation of blocks such that the first edge network 306 generates a forked ledger as described above. Thus, a first forked ledger will be created by the first edge network 306 at the same time as a second forked ledger is being created by the second edge network 306. Whenever the first edge network 306 reconnects with the core network 304, the overlay protocol will merge the forked ledger from the first edge network 306 with the main ledger maintained by the core network 304. Notably, if the first edge network 306 reconnects prior to the second edge network 306, the first forked ledger from the first edge network 306 will merge with the main ledger prior to merging of the second forked ledger from the second edge network 306. If the first edge network 306 reconnects after the second edge network 306, the first forked ledger will be merged with the main ledger, which would include blocks corresponding to the second forked ledger, because the second forked ledger would have been previously merged with the main ledger maintained by the core network 304. Alternatively, if the first edge and second edge networks 306 reconnect at the same time their respective forked ledgers can be merged with the main ledger concurrently. Any number of forked ledgers can be created and merged concurrently.

In an example, the overlay protocol can create and maintain multiple main ledgers concurrently, wherein each main ledger is a database for different information. For example, a first ledger can be a database containing information relating to images captured by one or more unmanned aerial vehicles (UAVs), and a second ledger can be a database containing information relating to tracking locations of vehicles. The overlay protocol can determine which ledger a particular ledger message/information corresponds to. The overlay protocol can then create and add a block corresponding to that ledger message/information to the ledger identified for that ledger message/information. Accordingly, ledger messages/information relating to the images captured by the one or more UAVs can be added to the first ledger, and ledger messages/information relating to tracking locations of vehicles can be added to the second ledger. Each of these ledgers can be forked and merged as discussed above in a manner that is independent from other ledgers. That is, forked ledgers from the first ledger are merged with the main first ledger and forked ledgers from the second ledger are merged with the main second ledger. Any number of ledgers can be concurrently maintained in this way.

FIG. 6 is a block diagram of an example main ledger 502 and an example forked ledger 504. As discussed above, the forked ledger 504 starts as a copy of the main ledger 502. Due to the distribution of blocks throughout the network 100, each peer device 102-1 that is communicatively coupled to the core network 304 can have a current copy of the main ledger 502. When an edge network 306 becomes disconnected from the core network 304, the edge network 306 can commence constructing local blocks and appending them to its copy of the main ledger 502. Appending these local blocks to a copy of the main ledger 502 creates the forked ledger 504. Because the forked ledger 504 starts as a copy of the main ledger 502, a beginning subset of blocks 602 of the forked ledger 504 is identical to a beginning subset of blocks 602 of the main ledger 502. Because the core network 304 continues appending blocks to the main ledger 502 after disconnection of the edge network 306, an end subset of blocks 604 of the main ledger 502 will be different than an end subset of blocks 606 of the forked ledger 504. Thus, the main ledger 502 and the forked ledger 504 share a common beginning subset of blocks 602 but have different respective end subsets of blocks 604, 606.

When the edge network 306 creating the forked ledger 504 reconnects with the core network 304, the edge network 306 sends the forked ledger 504 to the core network 304 which merges the forked ledger 504 with the main ledger 502. As mentioned above, merging the forked ledger 504 with the main ledger 502 creates a merged ledger 506 that includes all the valid information from both the forked ledger 504 and the main ledger 506. The merged ledger 506 will be the new main ledger going forward. Merging can include the core network 304 rebuilding at least some of the blocks from the main ledger 502 and/or the forked ledger 504, so that the information from both ledgers 502, 504 can be combined into a single merged ledger 506.

FIG. 7 is a block diagram of an existing block 702 prior to being rebuilt, a previous block 704 to the existing block in a respective ledger, a rebuilt block 706 that corresponds to the existing block and a previous block 708 in a respective ledger for the rebuilt block 706. One or more blocks can be rebuilt in order to reorder the blocks so they can be merged to create a merged ledger 504. One or more blocks can be rebuilt during merging because each block from the forked ledger 504 and main ledger 502 includes a previous block pointer 710 that points to the prior block in its respective ledger. Rebuilding a block creates a new block that includes the payload data 712 from an existing block of the main ledger 502 or the forked ledger 504. Rebuilding a block includes replacing at least some information in the header of the block. Information that is replaced includes the previous block pointer 710, which is replaced with a new previous block pointer 710 that corresponds to the location for the rebuilt block in the merged ledger 504. Additionally, because each block includes a hash 714 that is calculated based on the payload data 712 and the previous block pointer 710 of that block, rebuilding a block also includes recalculating the hash 714 to be based on the new previous block pointer 710. Accordingly, a rebuilt block 706 includes the same payload data 712 as the existing block 702 from which the rebuilt block 706 was created, but at least the previous block pointer 710 and the hash 714 of the rebuilt block 706 are different than the previous block pointer 710 and the hash 714 of the existing block 702. Other information in the rebuilt block 706 can also be different than in the corresponding existing block 702 such a block group number 716. Block group numbers are discussed in further detail below.

FIG. 8 is an illustration of example payload data 712 in a block. Payload data 712 is the generated by a peer 102 that is sent into the network 100 to be recorded in the ledger 100. In an example, each block in the main ledger 502 and the forked ledger 504 includes ordering information 802 in the payload data 712. Ordering information 802 is information in the payload data 712 that indicates an order for that payload data 712 with respect to other payload data 712. In an example, the ordering information 802 in each payload data 712 indicates an order relative to the payload data 712 of all of the other blocks in the main and forked ledgers 502, 504. In an alternative example, the ordering information 802 in each payload data 712 indicates an order relative to a subset of the other blocks. In this alternative example, the entire set of blocks in the main ledger 502 and the forked ledger 504 includes multiple subsets of blocks. Each subset of blocks has respective ordering information 802 that indicates an order for payload data 712 in that subset relative to other payload data 712 in that subset. The ordering information 802 in one subset may not indicate an order relative to payload data 712 in other subsets, however. In the example shown in FIG. 8, the ordering information 802 is a timestamp. The timestamp can be a time that corresponds to other information in the payload data 712, such as a time in which a message 804 in the payload data 712 was sent or received. In another example, the ordering information 802 can be a transaction counter that is incremented each time a transaction for a specific account (e.g., a bank account) is recorded. Other examples of ordering information 802 are also possible.

FIG. 9 is a block diagram of an example merged ledger 902 that is constructed by merging the main ledger 502 of FIG. 6 with the forked ledger 504 of FIG. 6. Initially, the core network 304 identifies the common beginning subset of blocks 602 in the main ledger 502 and the forked ledger 504. This common beginning subset of blocks 602 is used as the beginning of the merged ledger 902. The core network 304 than appends one block to the common beginning subset of blocks 602 for each block in the end subsets of blocks 604, 606 of the main ledger 502 and the forked ledger 606. In the example shown in FIGS. 6 and 9, therefore, the core network 304 starts with the common beginning subset of blocks 602 consisting of blocks 1-3 and appends thereto blocks 4-10\*, which correspond to blocks 4-7 of the main ledger 502 and blocks 8-10 of the forked ledger 504. The core network 304 includes in the merged ledger 902 a block corresponding to each block in the main ledger 502 and all valid payload data 712 from forked ledger 504. During the merge process, the core network 304 can verify whether each unit of data (e.g., a message or a transaction) in the payload data from a forked ledger 504 is valid. Valid data is included as payload data in a rebuilt block. Invalid data is discarded. All valid payload data 712 from the main ledger 502 and the forked ledger 504 is captured in the merged ledger 902.

In addition to capturing all the payload data 712, the core network 304 also places the payload data 712 in the merged ledger 902 in order according to the ordering information 802 in each block. Since the common beginning subset of blocks 602 should already be in proper order as it was constructed originally, the core network 304 can simply use the beginning subset of blocks 602 for the beginning of the merged ledger 902. Depending on the age of the ledger, the beginning subset of blocks 602 may be quite large, so simply utilizing it as is can be efficient. The end subset of blocks 604 for the main ledger 502, however, has not been ordered with respect to the end subset of blocks 606 for the forked ledger 504 and vice versa. Accordingly, the core network 304 determines the order for the payload information 712 in each block of the respective end subsets of blocks 604, 606. FIG. 9 illustrates an example in which the order information 802 indicated that none of the payload data 712 in the end subset of blocks 606 for the forked ledger 504 went before any of the payload data 712 in the end subset of blocks 604 for the main ledger 502. In such a situation, the core network 304 can include the end subset of blocks 604 for the main ledger 502 in the merged ledger 902 immediately after the common beginning subset of blocks 602, just as the end subset of blocks 604 is positioned in the main ledger 502. Since these blocks 604 are in the same order and linked to the same previous block as they were originally constructed, the core network 304 does not need to rebuild any of these blocks 604. This takes care of all of the blocks from the main ledger 502.

To add the remaining blocks from the forked ledger 504 to the merged ledger 902, each block from the end subset of blocks 606 for the forked ledger 504 is rebuilt in order to append a corresponding block to the end subset of blocks 604 from the main ledger 502. That is, block 8 from the forked ledger 504 is rebuilt with a previous block pointer to block 7, forming a new block 8\* with the same payload data 712 as block 8. Block 9 from the forked ledger 506 is then rebuilt to point to block 8\*, forming a new block 9\*. Block 10 is then rebuilt to point to block 9\*, forming block 10\*. In this way, the merged ledger 902 is constructed by taking the entire main ledger 502 and appending thereto rebuilt blocks corresponding to the end subset of blocks 606 from the forked ledger 504. Alternatively, the core network 304 can append the end subset of blocks in the opposite manner by taking the entire forked ledger 504 and appending thereto rebuilt blocks corresponding to the end subset of blocks 604 from the main ledger 502. In some examples, the core network 304 can determine which way to append the blocks based on the ordering information 802 in the blocks (i.e., whether any payload data 712 from one end subset goes in front of payload data 712 from the other end subset) and a respective length of the main ledger 502 with respect to the forked ledger 504. The respective length of the main ledger 502 with respect to the forked ledger 504 can be used when the ordering information 802 indicates that either the forked ledger blocks or the main ledger blocks can be appended on the end. In such a situation, the core network 304 can select the longer of the two ledgers 502, 504 to use as the beginning of the merged ledger 902 and can append the end subset of blocks from the shorter of the two ledgers 502, 504 onto an end thereof.

FIG. 10 is a block diagram of an alternative example of a merged ledger 1002 that is constructed by merging the main ledger 502 with the forked ledger 504. As discussed above, the blocks from the main ledger 502 and the forked ledger 504 are ordered in accordance with their ordering information 802. The merged ledger 1002 of FIG. 10 is an example where the ordering information 802 indicates that the payload data 712 from the end subset of blocks 606 of the forked ledger 504 is to be interleaved with the payload data 712 of the end subset of blocks 604 of the main ledger 502. Construction of such a merged ledger 1002 can start with the common beginning subset of blocks 602 from the main ledger 502 and the forked ledger 504. The core network 304 can then either use blocks as is from the end subsets of blocks 604, 606 or rebuild blocks from the end subsets 604, 606 for use after the common beginning subset of blocks 602. Blocks can be used as is when the previous pointer 710 for the next block to be placed on the merged ledger 1002 already points to the current end block of the merged ledger 1002. For example, block 4 from the main ledger 502 is to be placed after block 3 of the merged ledger 1002, so block 4 can be used as is, because the previous pointer 710 for block 4 already points to block 3. Block 5, however, is to be placed after block 4, but block 5 points to block 3. Accordingly, the core network 304 rebuilds block 5 into block 5* which points to block 4 of the merged ledger 1002. As mentioned above, the blocks are placed in order in accordance with the ordering information 802 in the payload data 712 of each block. This process of placing blocks as is or rebuilding blocks continues until information corresponding to each of the valid blocks from the main ledger 502 and the forked ledger 504 has been placed into the merged ledger 1002.

The examples described above describe situations in which a single forked ledger 504 is merged with the main ledger 502. Similar processes, however, can be used to concurrently merge multiple forked ledgers 504 with the main ledger 502.

After creation of the merged ledger 1002, copies of the old main ledger 502 and the old forked ledger 504 may remain in the network 100. Accordingly, the network 100 uses mechanisms to determine which ledger to use as the main ledger going forward. In an example, the network 100 uses the block group numbers 716 to determine which is the main ledger. Each time ledgers are merged to create a new main (merged) ledger, the blocks that are rebuilt are given a block group number that is higher than any group block group number used previous. Referring back to FIG. 10, the group block number for the rebuilt blocks 5*-10* is set at 201. Going forward, the network 100 can use the ledger having the highest block group number at its end as the main ledger. In this way, the network 100 will use the merged ledger 1002 as the main ledger going forward.

FIG. 11 is a block diagram of an example peer device 102-1 implementing the ledger protocol. In an example, the peer device 102-1 can be an end-user device (e.g., a mobile phone, tactical radio). In another example, the peer device 102-1 can be a networking device (e.g., a router) configured to implement routing protocols (e.g., IP) for the network 100 in addition to the ledger protocol. In yet another example, the peer device 102-1 can be a standalone network appliance installed within the (IP) network 100 to implement the ledger protocol in the network 100.

In any case, the peer device 102-1 has ledger software 1210 thereon to implement the ledger protocol described herein. The ledger software 1210 includes fork/merge software 1211 to implement the forking and merging processes described herein. The peer device 102-1 can include one or more processing devices 1202 to execute the instructions of the ledger software 1210. The one or more processing devices 1102 can include a general-purpose processor special purpose processor. The instructions of the ledger software 1210 are stored (or otherwise embodied) on or in an appropriate storage medium or media 1206 (such as a flash or other non-volatile memory) from which the instructions are readable the processing device(s) 1202 for execution thereby. The peer device 102-1 also includes memory 1204 that is coupled to the processing device(s) 1202 for storing instructions (and related data) during execution by the processing device(s) 1202. Memory 1204 comprises, in one implementation, any suitable form of random-access memory (RAM) now known or later developed, such as dynamic random-access memory (DRAM). In other implementations, other types of memory are used.

The instructions of the ledger software 1210, when executed by the one or more processing devices 1202, cause the one or more processing devices 1202 to perform the actions (or a portion thereof) of a peer 102-1 described herein. This includes the actions relating to creating and maintaining ledgers, sending and routing ledger messages/information, and implementing an overlay protocol—including an overlay routing protocol as described herein.

The peer device 102-1 also includes one or more network interfaces 1214 for communicating with other ledger and non-ledger devices 102 in the network 100. The one or more network interfaces 1214 can be coupled to the one or more processing devices 1202. The one or more network interfaces 1214 can include wired and/or wireless interfaces such as an Ethernet interface, a satellite transceiver, an IEEE 802.11 transceiver, a cellular transceiver, or other interface.

FIG. 12 is a block diagram of an example software product 1300 that includes ledger software 1210. The software product 1300 includes a computer readable medium 1302 including ledger software 1210 that can be loaded onto an appropriate hardware device. The ledger software 1210 includes instructions that are stored or otherwise embodied on the computer readable medium 1302. The ledger software 1210 can be loaded onto an appropriate hardware device, such as peer 1200, for the hardware device to execute the instructions and perform the functionality (or a portion thereof) of a peer device 102-1 as described herein. The computer readable medium 1202 on which the ledger software 1210 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable medium within a computing device (e.g., a server or network accessible storage).

FIGS. 13A-13C depict an example implementation of the ledger software 1210. Two UAVs 1402, 1403 (which are peer devices 102-1) are mapping a geographical area. UAV1 1402 is mapping the northern part, while UAV2 1403 is mapping the southern part. In an example, both UAVs 1402, 1402 generate 100 pixels per second. The pixel information is to be captured in a ledger database by the ledger software 1210.

While both UAVs 1402, 1403 are coupled to the core peer 1404 as shown in FIG. 13A, the messages from both UAVs 1402, 1403 with pixel information are transmitted across the network to the core peer 1404. The core peer 1404 builds the main ledger and disseminates its blocks across the network. Both UAVs 1402, 1403 receive blocks committed to the main ledger, which includes pixel information for both northern and southern parts.

When the link between the leader peer 1406 and the core peer 1404 ceases to exist as shown in FIG. 13B, the leader 1406 initializes a local ledger. The leader 1406 creates blocks based on messages from UAV1 1402 and disseminates the blocks to locally connected peers such as UAV1 1402. UAV1 1402 uses the local ledger to store and access the map information. As a result, UAV1 1402 will continue to store and display the upper half of the map, without losing the lower half data that is already stored in the ledger before the link with the core 1404 ceased. UAV2 1403 will continue to use the main ledger to store and display the lower part, without losing data that already exists in ledger before the link ceased. The images of on FIGS. 13A-13C illustrate the ledger information available to UAV1 1402 continuing to have the upper part growing while the lower part is static. Similarly, the ledger information available to UAV2 1403 continues to have the lower part growing while the upper part is static.

As shown in FIG. 13C, when the link between the leader 1406 and the core 1404 is repaired, the leader 1406 and the core 1404 cooperate to merge the local ledger into the main ledger. The leader 1406 stops generating local blocks and sends the local ledger blocks to the core 1404. The core can merge the local blocks into the main ledger and continues generating new blocks from new messages received from both UAVs 1402, 1403. As a result, both UAVs have access to the two halves of the map without data loss after reconnection of the peers.

What is claimed is:

1. A program product comprising:
    a non-transitory processor readable medium having software stored thereon, the software, when executed by one or more processing devices, configured to:
    merge a first distributed ledger with a second distributed ledger to form a merged ledger,
        wherein the first distributed ledger consists of a first beginning subset of blocks followed by a first end subset of blocks, wherein the second distributed ledger consists of a second beginning subset of blocks followed by a second end subset of blocks, wherein the first beginning subset of blocks is identical to the second beginning subset of blocks and the first end subset of blocks is different than the second end subset of blocks,
        wherein the merged ledger includes the first beginning subset of blocks followed by blocks corresponding to the first end subset of blocks and the second end subset of blocks,
        wherein merge includes rebuild at least one of the blocks from the first or second end subset of blocks in order to link the payload data from at least one of the blocks to a different prior block than its corresponding block from the first or second end subset of blocks,
        wherein each rebuilt block includes identical payload data from a corresponding block in the first or second end subset of blocks and each rebuilt block has a new hash, a. new previous block pointer to link the rebuilt block to the different prior block, and a block group number that is higher than all block group numbers in the first beginning subset of blocks.

2. The program product of claim 1, wherein each block in the first distributed ledger and each block in the second distributed ledger includes ordering information that corresponds to payload data in that block and indicates an order for that payload data relative to payload data of at least some of the blocks in the first distributed ledger and the second distributed ledger,
    wherein merge the first distributed ledger with the second distributed ledger includes:
        if the ordering information in each block indicates that none of the payload data in the second end subset of blocks goes before any payload data in the first end subset of blocks, merge the first distributed ledger with the second distributed ledger by appending blocks corresponding to the second end subset of blocks to the first distributed ledger; and
        if the ordering information in each block indicates that at least some of the payload data in the second end subset of blocks goes before payload data in the first end subset of blocks, merge the first distributed ledger with the second distributed ledger by interleaving one or more blocks corresponding to the second end subset of blocks with one or more blocks corresponding to the first end subset of blocks such that the blocks in the merged ledger are linked in order according to the ordering information.

3. The program product of claim 2, wherein the ordering information is a timestamp and the order indicated is a chronological order.

4. The program product of claim 3, wherein the timestamp is a timestamp indicating a time in which a message was sent or received, wherein the message is in the payload data of the block that the timestamp is in.

5. The program product of claim 2, wherein the ordering information is a transaction counter.

6. The program product of claim 1, wherein the second distributed ledger is a forked ledger of the first distributed ledger.

7. The program product of claim 6, wherein the second distributed ledger is formed in response to a network disconnection and the first distributed ledger and the second distributed ledger are merged in response to a reconnection of the network.

8. A device comprising:
    one or more processing devices;
    storage media communicatively coupled to the one or more processing devices, the storage media including software stored thereon, the software, when executed by the one or more processing devices, configured to:
    merge a first distributed ledger with a second distributed ledger to form a merged ledger,
        wherein the first distributed ledger consists of a first beginning subset of blocks followed by a first end subset of blocks, wherein the second distributed ledger consists of a second beginning subset of blocks followed by a second end subset of blocks, wherein the first beginning subset of blocks is identical to the second beginning subset of blocks and the first end subset of blocks is different than the second end subset of blocks, wherein the merged ledger includes the first beginning subset of blocks followed by blocks corresponding to the first end subset of blocks and the second end subset of blocks, wherein merge includes rebuild at least one of the blocks from the first or second end subset of blocks in order to link the payload data from at least one of the blocks to a different prior block than its corresponding block from the first or second end subset of blocks, wherein each rebuilt block includes identical payload data from a corresponding block in the first or second end subset of blocks and each rebuilt block has a new hash, a new previous block pointer to link the rebuilt block to the different prior block, and a block group number that is higher than all block group numbers in the first beginning subset of blocks.

9. The device of claim 8, wherein each block in the first distributed ledger and each block in the second distributed ledger includes ordering information that corresponds to payload data in that block and indicates an order for that payload data relative to payload data of at least some of the blocks in the first distributed ledger and the second distributed ledger, wherein merge the first distributed ledger with the second distributed ledger includes:
 if the ordering information in each block indicates that none of the payload data in the second end subset of blocks goes before any payload data in the first end subset of blocks, merge the first distributed ledger with the second distributed ledger by appending blocks corresponding to the second end subset of blocks to the first distributed ledger; and
 if the ordering information in each block indicates that at least some of the payload data in the second end subset of blocks goes before payload data in the first end subset of blocks, merge the first distributed ledger with the second distributed ledger by interleaving one or more blocks corresponding to the second end subset of blocks with one or more blocks corresponding to the first end subset of blocks such that the blocks in the merged ledger are linked in order according to the ordering information.

10. The device of claim 9, wherein the ordering information is a timestamp and the order indicated is a chronological order.

11. The device of claim 10, wherein the timestamp is a timestamp indicating a time in which a message was sent or received, wherein the message is in the payload data of the block that the timestamp is in.

12. The device of claim 9, wherein the ordering information is a transaction counter.

13. The device of claim 8, wherein the second distributed ledger is a forked ledger of the first distributed ledger.

14. The device of claim 13, wherein the second distributed ledger is formed in response to a network disconnection and the first distributed ledger and the second distributed ledger are merged in response to a reconnection of the network.

15. A method for one or more ledgers comprising:
 merging a first distributed ledger with a second distributed ledger to form a merged. ledger,
 wherein the first distributed ledger consists of a first beginning subset of blocks followed by a first end subset of blocks, wherein the second distributed ledger consists of a second beginning subset of blocks followed by a second end subset of blocks, wherein the first beginning subset of blocks is identical to the second beginning subset of blocks and the first end subset of blocks is different than the second end subset of blocks,
 wherein the merged ledger includes the first beginning subset of blocks followed by blocks corresponding to the first end subset of blocks and the second end subset of blocks,
 wherein merging includes rebuilding at least one of the blocks from the first or second end subset of blocks in order to link the payload data from at least one of the blocks to a different prior block than its corresponding block from the first or second end subset of blocks,
 wherein each rebuilt block includes identical payload data from a corresponding block in the first or second end subset of blocks and each rebuilt block has a new hash, a new previous block pointer to link the rebuilt block to the different prior block, and a block group number that is higher than all block group numbers in the first beginning subset of blocks.

16. The method of claim 15, wherein each block in the first distributed ledger and each block in the second distributed ledger includes ordering information that corresponds to payload data in that block and indicates an order for that payload data relative to payload data of at least some of the blocks in the first distributed ledger and the second distributed ledger, wherein merging the first distributed ledger with the second distributed ledger includes:
 if the ordering information in each block indicates that none of the payload data in the second end subset of blocks goes before any payload data in the first end subset of blocks, merging the first distributed ledger with the second distributed ledger by appending blocks corresponding to the second end subset of blocks to the first distributed ledger; and
 if the ordering information in each block indicates that at least some of the payload data in the second end subset of blocks goes before payload data in the first end subset of blocks, merging the first distributed ledger with the second distributed ledger by interleaving one or more blocks corresponding to the second end subset of blocks with one or more blocks corresponding to the first end subset of blocks such that the blocks in the merged ledger are linked in order according to the ordering information.

17. The method of claim 16 wherein the ordering information is a timestamp and the order indicated is a chronological order.

* * * * *